United States Patent
Jackson et al.

(10) Patent No.: US 7,057,492 B2
(45) Date of Patent: Jun. 6, 2006

(54) ENABLING/ENHANCING A FEATURE OF AN ELECTRONIC DEVICE USING RADIO FREQUENCY IDENTIFICATION TECHNOLOGY

(75) Inventors: Miles R. Jackson, North Barrington, IL (US); Joseph F. Wodka, Hoffman Estates, IL (US); Timothy James Collins, Lockport, IL (US); Patrick L. Rakers, Kildeer, IL (US); Mark Paul Lill, Elgin, IL (US)

(73) Assignee: Motorola, Inc., Schaumburg, IL (US)

( * ) Notice: Subject to any disclaimer, the term of this patent is extended or adjusted under 35 U.S.C. 154(b) by 63 days.

(21) Appl. No.: 10/092,150

(22) Filed: Mar. 6, 2002

(65) Prior Publication Data

US 2002/0093426 A1    Jul. 18, 2002

Related U.S. Application Data

(63) Continuation-in-part of application No. 09/061,146, filed on Apr. 16, 1998, now Pat. No. 6,611,199, which is a continuation-in-part of application No. 08/540,813, filed on Oct. 11, 1995, now abandoned.

(51) Int. Cl.
*G05B 19/12*    (2006.01)

(52) U.S. Cl. .................. 340/5.61; 340/572.7; 705/14

(58) Field of Classification Search ............... 340/5.61, 340/5.65, 10.4, 10.42, 10.1; 235/380
See application file for complete search history.

(56) References Cited

U.S. PATENT DOCUMENTS

| | | | |
|---|---|---|---|
| 4,591,854 A * | 5/1986 | Robinson | 340/5.65 |
| 5,250,789 A | 10/1993 | Johnsen | |
| 5,287,266 A | 2/1994 | Malec | |
| 5,317,309 A * | 5/1994 | Vercellotti et al. | 340/10.34 |
| 5,732,401 A | 3/1998 | Conway | |
| 5,785,181 A | 7/1998 | Quartararo | |
| 5,815,426 A * | 9/1998 | Jigour et al. | 365/51 |
| 5,969,633 A | 10/1999 | Rosler | |
| 5,995,898 A | 11/1999 | Tuttle | |
| 6,002,344 A | 12/1999 | Bandy | |
| 6,172,596 B1 | 1/2001 | Cesar | |
| 6,317,028 B1 | 11/2001 | Valiulis | |
| 6,404,339 B1 * | 6/2002 | Eberhardt | 340/10.34 |
| 2002/0034978 A1 * | 3/2002 | Legge et al. | 463/25 |

FOREIGN PATENT DOCUMENTS

WO    WO 01/69548    *    9/2001    ............ 235/380

* cited by examiner

*Primary Examiner*—Brian Zimmerman

(57) ABSTRACT

A radio frequency identification ("RFID") device (102) having stored thereon an expiration and a set of data bits which, when presented to a processing device (602) via a RFID reader (206), causes the processing device (602) to enable a feature that would otherwise be disabled in an electronic device (600), and disable the feature when the expiration reaches a predetermined value.

23 Claims, 5 Drawing Sheets

EX. BLOCK DIAGRAM OF
INFORMATION SEGMENTATION

ENABLING/ENHANCING A FEATURE OF AN ELECTRONIC DEVICE USING RADIO FREQUENCY IDENTIFICATION TECHNOLOGY

CROSS-REFERENCE TO RELATED APPLICATIONS

The present invention is a continuation-in-part of a commonly-assigned U.S. patent application by Ted Geiszler et al. titled "Remotely Powered Electronic tag and Associated Exciter/Reader and Related Method," Ser. No. 09/061,146 filed Apr. 16, 1998, now U.S. Pat. No. 6,611,199, which was a continuation-in-part to commonly-assigned prior U.S. patent application by Ted Geiszler et al. titled "Remotely Powered Electronic tag and Associated Exciter/Reader and Related Method," Ser. No. 08/540,813 filed Oct. 11, 1995, (now abandoned), the disclosure of which prior application is hereby expressly incorporated by reference, verbatim and with the same effect as though such disclosure were fully and completely set forth herein.

The present invention is also related to common-assigned U.S. patent application by Joseph Wodka et al. titled "Customization of Promotional Material Through use of Programmable Radio Frequency Identification Technology," Ser. No. 10/092,106 filed Mar. 6, 2002, (currently pending).

FIELD OF THE INVENTION

The present invention relates generally to enabling/enhancing a feature of an electronic device using radio frequency identification technology.

BACKGROUND OF THE INVENTION

Promotional incentive methods, such as distribution of coupons and toys in cereal boxes, are some of the traditional ways retailers and manufacturers entice consumers to purchase a product in order to build loyalty to the specific goods or services. Further, the consumer reaction to these and other promotional efforts is useful to the marketing of the products. This information, also referred to as data mining, is viewed by many as an invaluable asset used to build loyalty to the products, increase market share, and build future marketing campaigns.

To collect this information, and to influence the buying habits of consumers, employed promotional methods range from exposing the entire population to media-oriented information messages, to more controlled environments, such as analyzing selected panelists.

With respect to incentives for electronic device, such as electronic games, "cheat codes" have been used in the past for magazine subscriptions. A disadvantage to the "cheat codes" is that they do not translate well to the cereal box model, for example, since they are easily replicated and disseminated without buying the cereal. For example, many codes are listed on personal web sites.

Thus, there exists a need for a technology that can provide an enhancement to an electronic device, while providing marketing research to distributors, manufacturers, and/or retailers.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

In general, the present invention provides promotional material containing radio frequency identification ("RFID") devices that can be (re)programmed with an incentive (e.g., actual price of an item, price reduction of an item, price reduction of an item based on the purchase of an additional item, etc.) that is preferably selected at a point-of-decision or point-of-redemption of a particular item by a consumer. The present invention also provides a means that allows RFID devices to be attached to items, which allows for a negotiation interaction between the consumer, item/product, and the store. For sake of brevity, only two environments in which the promotional material of the present invention may be used are described herein: shopping at a retail store and playing an electronic game. In these environments, the present invention provides a means to track and understand coupon usage from distribution to redemption, provides a means to target and customize discount coupons to individual consumers at the point of instore entry, and provides a means to enhance promotional incentives to be used with electronic games and/or other electronic means. It should be noted that the promotional material as described in the present invention may be used in many other fashions and environments not described herein but which still remain within the spirit and scope of the present invention.

Figure 1:
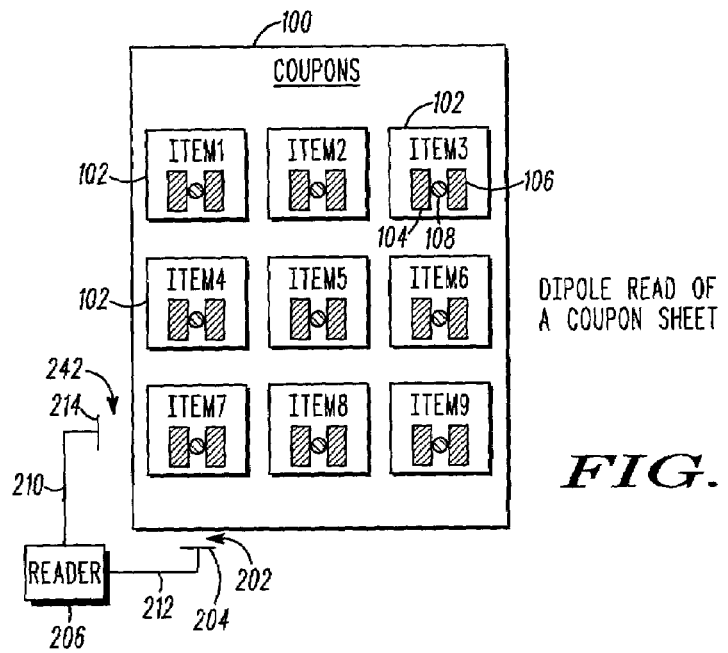
FIG. 1 illustrates a top view of a sheet of paper having multiple electrostatic RFID devices implanted within, and showing how each individual RFID device can be accessed through a dipole read in accordance with the present invention.

In the first environment described herein, the promotional material 100 acts as a coupon sheet. As illustrated in FIGS. 1 and 2, the promotional material 100 incorporates RFID technology that uses electrostatic coupling. It should be noted that the promotional material might also incorporate RFID technology that uses electromagnetic coupling or other similar technologies. The promotional material 100 provides customized incentives to individual consumers on a broad scale. Preferably, the consumer is presented with the promotional material 100 after consumer identification to an in-store system. Consumer identification to the in-store system can be made in a number of ways, including, but not limited to, the following: an identification card, a smart card, a shopping card, a credit/debit card, or the like. The promotional material 100 distributed to the consumer may be customized to the individual consumer based on previous purchases, related items, frequency of purchases, demographics of the consumer, a consumer provided list, or the like.

As illustrated in FIGS. 1 and 2, the promotional material 100 comprises a plurality of RFID devices 102, however, any number of RFID devices, including one, may be included in the promotional material 100. When the consumer profile has been determined, a predetermined number of RFID devices 102 (in this example, nine) are (pre) programmed and printed/attached to the promotional material 100, however, there are no restrictions placed on the number of predetermined locations within the paper stock and there are no restrictions placed on number of actual RFID devices printed/attached.

The promotional material 100 may be made of paper, plastic (including polyester and metalized material), synthetic paper, reinforced paper, cardboard, synthetic paper coated cardboard, or the like, depending on the particular application. In the preferred embodiment, the promotional material 100 is made of paper and the paper acts a substrate for the RFID device(s) 102.

In FIG. 1, each RFID device 102 comprises two antenna elements (electrodes) 104, 106 and a circuit 108 coupled to the antenna elements 104, 106. The antenna elements 104, 106 are a conductive pattern formed, disposed or printed on the substrate (in this case, the paper in which the RFID devices are printed). Preferably, the antenna elements 104, 106 are printed onto the paper with conductive ink, but not limited to such. FIG. 1 also illustrates a RFID device 102 coupled to a reader 206 in a dipole fashion. In this case, capacitive coupling 242, 202 between the antenna elements 214, 204 of the reader 206 and the antenna elements 104, 106 of the RFID device 102 allows for a circuit path between the RFID device 102 and the reader 206.

Figure 2A:
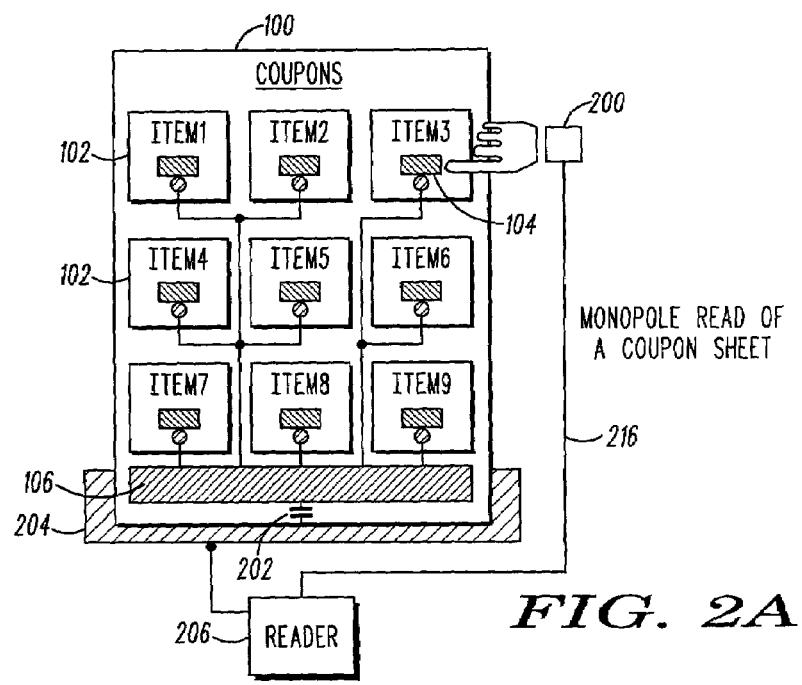
FIG. 2A illustrates a top view of a sheet of paper having multiple electrostatic RFID devices implanted within, and showing how each individual RFID device can be accessed through a monopole read in accordance with the present invention.
Figure 2B:
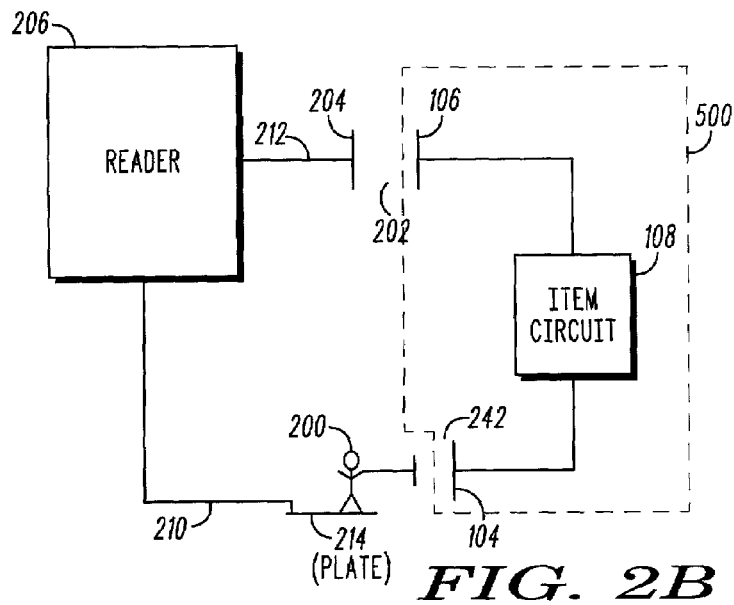
FIG. 2B illustrates the coupling that exists between an electrostatic RFID device, a person and a reader with the person standing on a plate that creates a common path between the reader and the electrostatic RFID device in accordance with the present invention.
Figure 2C:
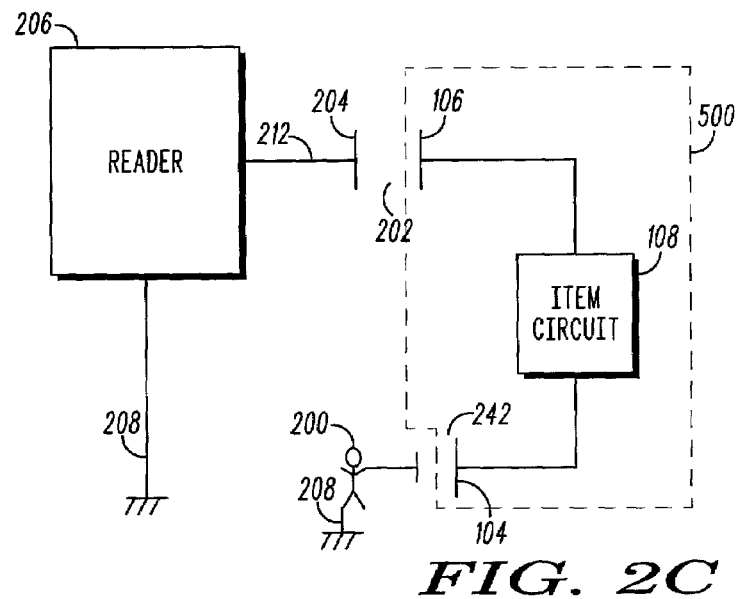
FIG. 2C illustrates the coupling to earth ground that exists between an electrostatic RFID device, a person and a reader with the person electrically coupled to earth ground and the reader electrically coupled to earth ground in accordance with the present invention.

Alternatively, in FIGS. 2A, 2B, and 2C, however, each electrostatic RFID device 102 is coupled to the reader through a human body 200 or any other suitable means. In this configuration, a capacitance 202 exists between an antenna element 204 of the reader 206 and an antenna element 106 that is common to the plurality of RFID devices 102 printed/attached on the promotional material 100. Further, each RFID device 102 has an individual antenna element 104 that is electrically coupled to the reader 206 through the human body 200 and a return circuit path 216. This return circuit path 216 could comprise a plate 214 on which the person stands that is electrically connected 210 to a circuit node in the reader as shown in FIG. 2B. Alternatively, the return circuit path 216 could be provided through an external ground 208 that is common to both the reader 206 and the consumer 200, as shown in FIG. 2C. The act of touching the individual antenna element 104 on a given RFID device 102 creates a circuit path through the body 200, which allows an electrical current to flow between the RFID device 102 and the reader 206 as illustrated in FIGS. 2B and 2C. Such a configuration is known as a monopole configuration to those skilled in the art of electrostatic RFID technology.

In general, it should be noted that the RFID device 102 is designed to capacitively couple with the reader 206; the RFID device 102, however, can also couple to the reader via inductive coupling, radio frequency coupling, inductive and capacitive coupling, or the like. The reader 206 may comprise, but is not limited to, a display, an exciter, receiver, demodulator, a processor, a coupling device (e.g., an antenna), or the like. The coupling device and/or the processor may or may not be collocated with the reader 206. The exciter circuitry of the reader 206 generates a RF carrier signal used to create either an electrostatic or electromagnetic field through a capacitive, inductive, or resonant antenna element (e.g., a capacitive plate, electrode, coil, half-wave dipole, etc.). In the preferred embodiment, capacitively coupled energy from the reader 206 powers the RFID device 102. By changing the intensity of the electrostatic field as a function of time, data can be transferred between the reader 206 and the RFID device 102. The reader 206 may display information that is represented by the data 300 that has been transmitted by the RFID device 102 that is communicating with the reader 206. Since a typical reader is known, further description is not provided here. An example of a typical electrostatic reader is described in U.S. Pat. No. 6,282,407. The present invention, however, may be implemented using other readers.

Figure 3:
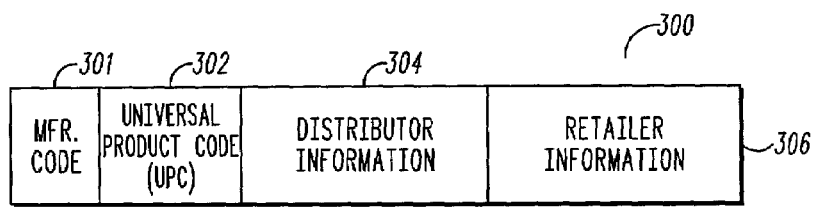
FIG. 3 illustrates an example view of how the programmable bits on the device die can be segmented to provide a passive data collection mechanism in accordance with the present invention.

Returning to the retail shopping environment, as shown in FIG. 3, an example of how the data field 300 of the circuit 108 can be segmented is illustrated. The circuit 108 preferably comprises bits that could be programmed by a plurality of sources: the producer, the distributor, and the retailer of the RFID device 102. The producer of the RFID device 102 typically programs the manufacturer code 301 and the Universal Product Code ("UPC") 302 into the circuit 108. The distributor of the RFID device 102 typically programs the distributor information 304 that identifies the distributor, means of distribution (e.g., periodicals, direct mailings, inserts, item package, or the like), timestamp, etc., all of which can be used to track the effectiveness of the marketing campaign. The retailer of the RFID device 102 has the option to further program the circuit 108 with retailer information 306 acquired at point-of redemption, such as, redemption date, quantity of item purchased, and/or purchase price of item. As such, the circuit 108 can be configured for write-once capabilities in the preferred embodiment of the present invention, thus providing the ability for additional information to be programmed at point-of-redemption by the retailer while providing tamper resistance security to previously programmed information by the producer and the distributor. Moreover, all the information programmed by various parties need not be shared among all parties.

The RFID device 102 in combination with coupons allows the producer and their marketing organizations to effectively run product promotions by data mining (i.e., analyzing specific pattern usage). Distributor information 304 can be programmed, prior to distribution, into the RFID device 102 along with the retailer/redemption information 306 to provide a data collection mechanism that can be used to produce market conclusions for a geographic area or a particular retail establishment. The distributor information 304, programmed prior to distribution, can consist of region information specified at a local level, such as zip code, the distribution method, time of distribution, or any other information deemed appropriate by the producer. Retailer information 306 can track product movement data, such as quantity, price, time purchased, or any other factor that can be used to determine consumer behaviors. The number and type of parameters tracked is dependent on the producer's requirements.

An example of data mining is illustrated in the following example. To determine the effectiveness of a product promotion within a local region, such as a city, the RFID devices 102 are distributed through inserts in local newspapers as coupons. The distributor information 304 contains the region (zip code) and timestamp that can be programmed at the local newspaper distribution center. As consumers redeem the RFID devices/coupons at their local retailers, information, such as when it was redeemed and the quantity redeemed, can be programmed into the retailer information section 306 of the RFID device 102. After consumer redemption at the store, the RFID devices 102 are sent to a clearing house which electronically reads the data 300 stored onto each RFID device 102, using either dipole or monopole coupling, and creates a database of information. The producer, or its marketing organization, of these RFID devices/coupons 102 can use this database of information to determine which distribution methods were the most successful (e.g., time usage data, consumer preferences, and retailer preferences).

Figure 4:
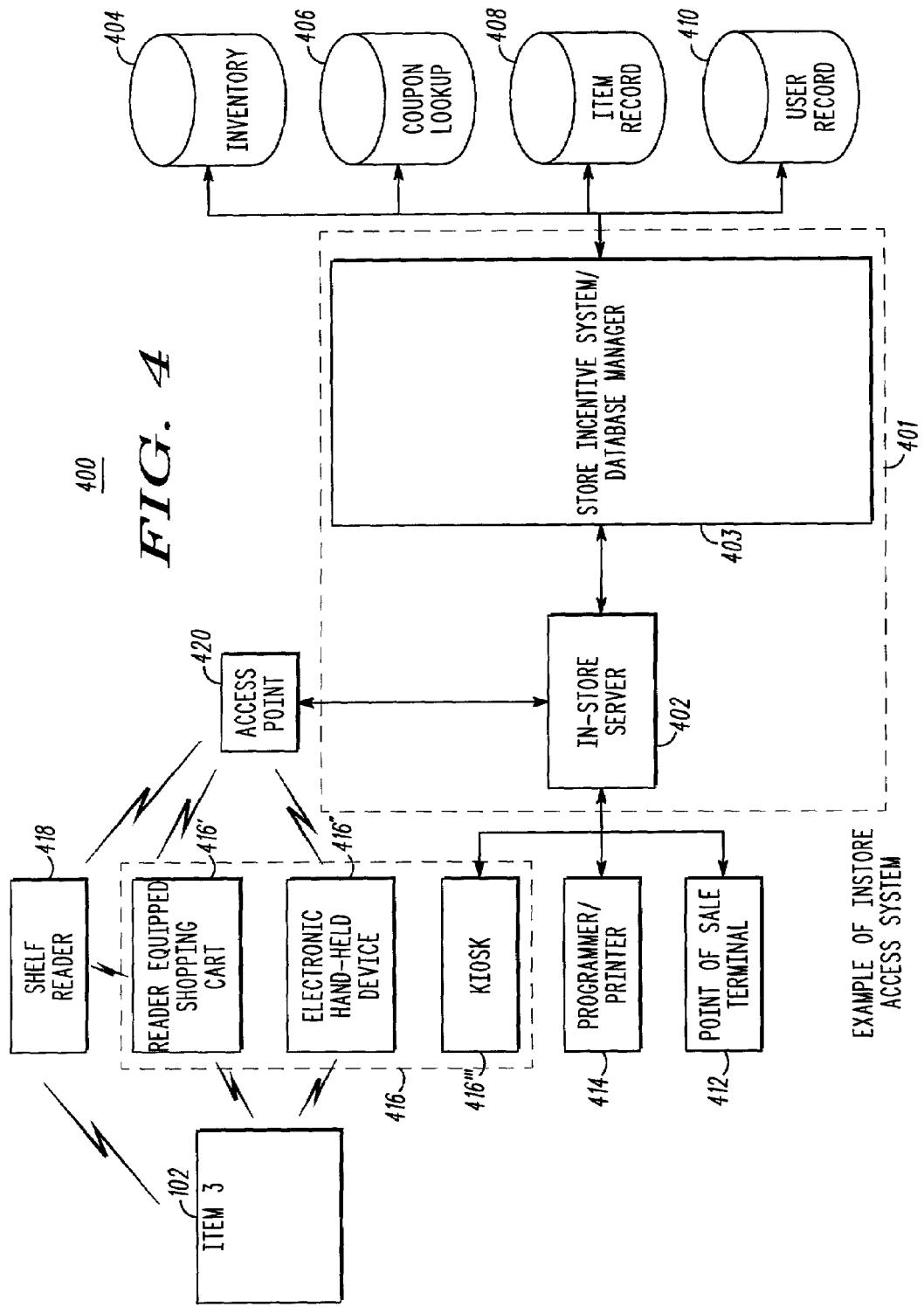
FIG. 4 illustrates a block diagram perspective view of an in-store system that can be used in conjunction with the devices in FIGS. 1 and 2 to provide incentive pricing, tracking, user profile and product information access in accordance with the present invention.

Referring to FIG. 4, a block diagram of an in-store system 400 for use in a retail environment is illustrated. Typically, the system 400 comprises processing means 401 and back-end databases 404, 406, 408, 410. In the preferred embodiment, the processing means 401 comprises an in-store server 402 and a store incentive system/database manager 403; the back-end databases comprise a product inventory database 404, a coupon lookup database 406, an item record database 408, a user record database 410, and/or the like. The system 400 further comprises front-end access means, such as a point-of sale terminal 412, a programmer/printer 414, a user device 416 and/or the like. The user device 416 is a RFID reader, a display, and preferably, a writer. The user device 416 is capable of reading RFID devices 102 and displaying information to the consumer, either transmitted by the RFID device 102 itself, the in-store server 402, or any other device capable of communicating with the user device 416; optionally, the user device 416 has the capability of reprogramming the RFID device 102 at the point-of-decision by the consumer, or storing the modified incentive at point-of-decision and downloading the information at checkout. The user device can be a reader-equipped shopping cart 416', a hand-held device (e.g., a personal digital assistant) 416'', a kiosk 416''', or any other suitable means that will allow the consumer 200 and the in-store system 400 to interact.

Preferably, operation of the user device in the present invention is as follows, but not limited to such. The consumer is provided with the user device 416 capable of accepting information from a consumer through keypad, magnetic strip, or other RFID technologies. The user device 416 is capable of transmitting and receiving information from the in-store server 402 through multiple access points 420. Preferably, the consumer presents his "shopping card" to the user device 416 to register with the in-store server 402. The card itself may just contain the consumer's name or it may contain specific information about the consumer. The intention of the card is to allow the in-store server 402 to link the consumer to possible price negotiations as well as determine the consumer's shopping preferences. The user device 416 stores information from the shopping card into its memory until check out; the user device 416 transmits the identification of the consumer, and other information, to the in-store server 402 (when requested or continuously) using any communications method available. Once the consumer 200 registers with the in-store server 402, the consumer 200 aligns the antenna element(s) of the user device (i.e., capacitive plate(s) in the preferred embodiment) over the antenna element(s) 104 (106) on the RFID device 102 in order to allow the RFID device 102 to receive power and communicate with the user device 416. The display of any incentive or information to the consumer 200 occurs from the RFID device 102 or in-store server 402 directly to the user device 416 each time a RFID device 102 is presented to the user device 416. Preferably, at the point-of-sale terminal 412, the user device 416 would be downloaded and compared to the actual selected items 500 to determine final incentive value awarded; alternatively, the user device 416 may be capable of re-programming the RFID device 102 with the final incentive value awarded at point-of decision by the consumer.

The first example of the interaction between the consumer and the in-store system is when the RFID device 102 is attached to the promotional material. Upon entering a store, the consumer is provided with a user device 416 and registers with the in-store server as described above. Once registered, the in-store system 400 selects a set of promotions/incentives based on any given number of parameters. The number of parameters used is dependent on the application and system design. The parameters can be selected from, but not limited to, consumer purchase history, promotional specials, consumer product loyalty, consumer-provided shopping list, and/or the like. Once the set of promotions/incentives are selected, they are programmed into the RFID device 102 along with other information used for data mining and tracking purposes (e.g., manufacturer information 301, UPC 302, distributor information 304, retailer information 306, consumer information, or the like) by the programmer/printer 414; alternatively, all of the bits in the data field 300 in the RFID device(s) could be preprogrammed prior to consumer identification to the in-store system 400, as opposed to being specifically tailored to a particular consumer. The RFID devices are then attached to the promotional material 100 for use by the consumer.

The promotional material 100, with the attached RFID device(s) 102, can be used in a number of ways. In the simplest form, the promotional material 100 becomes a visual aid identifying to the consumer 200 the specific product tailored to their preferences. In a more complex form, the promotional material becomes an "active" coupon(s) allowing the promotional incentive programmed into the RFID device(s) 102 to be modified/enhanced at the point-of-decision or point-of-redemption by the consumer.

In the more complex form, for example, the consumer 200 presents the RFID device 102 to the user device 416 that provides expanded capabilities for the consumer 200. Upon reading the UPC 302 from the RFID device 102, the user device 416 provides information on an item or enhances the incentive on a selected item at point-of decision or point-of redemption. In one application, information, such as product ingredients, menu suggestions, or competitor offers are examples of possible information that can be retrieved and displayed by the user device 416 by selecting an individual RFID device 102. Upon selecting the RFID device 102 with the user device 416, the in-store system 400 may determine a modified purchase incentive to be transmitted to the user device 416. The user device 416 reads the UPC 302 of the item that has been selected for purchase and identifies the item to the in-store server 402. The store incentive system/database manager 403 can reduce a product price by taking into account the manufacturer's lowest possible price of the item, the consumer's brand preference, and other data points in order to entice the consumer to purchase the selected item or switch brands. This process can go on until the consumer 200 makes a final decision (purchases the item or puts the item back on the shelf), or the price of the item cannot be reduced further.

Figure 5:
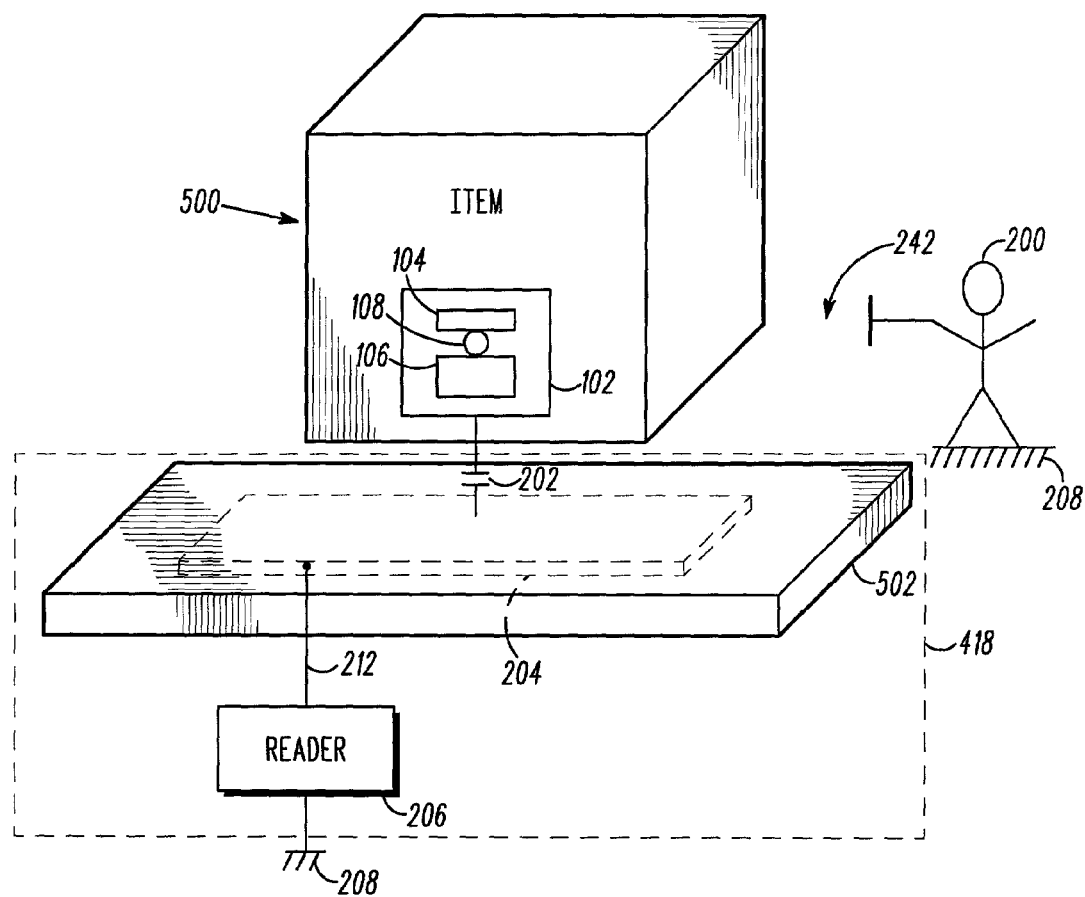
FIG. 5 illustrates the coupling that exists between an electrostatic RFID device attached onto an item, a person and a reader on a shelf with the person electrically coupled to earth ground and the reader electrically coupled to earth ground in accordance with the present invention.

The second example of the interaction between the consumer and the in-store system is when the RFID device is attached to an item. Upon entering a store, the consumer is provided with a user device 416 and registers with the in-store server as described above. During the normal shopping process, the consumer 200 may touch an item of interest. As previously described, the act of touching 200 a capacitively-coupled RFID device 102 attached to an item allows the reader to power the RFID device 102, and the RFID device, in return, transmits its UPC 302 to the reader. The act of touching the RFID device 102 completes a path 208, 200, 242, 202, 212 through either ground 208 or a common reader/RFI) device path 210, 214, 200, 242, 202, 212 allowing the RFID device 102 to receive power and transmit data 300 to the reader. As illustrated in FIG. 5, a shelf reader antenna element 204 sits upon a shelf 502 where the shelf reader 418 transmits the UPC 302 as well as the identification number of the shelf to the in-store server 402 using a data transmission method known in the art. It should be noted that each store shelf 418 may or may not have unique identification numbers; the use of a unique shelf identification number allows for consumer location. Since the in-store server 402 knows that the item 500 is of interest to the consumer (i.e., the item was touched), the in-store server 402 may enter into a price negotiation with the consumer 200. As long as the consumer 200 touches the RFID device 102 attached to the item 500, the RFID device 102 is continuously transmitting data 300 to the shelf reader 418. Since the RFID device 102 is continuously transmitting data 300, the in-store server 402 can assume that the decision to purchase the item 500 has not been made and the price of the item 500 can be reduced to influence the consumer to place the item 500 into his shopping basket. By analyzing the consumer's patterns (i.e., touched and replaced a product on the shelf, but did not purchase), the in-store server 402 may influence the purchase decision of the consumer 200.

The in-store server 402 uses the "shopping card" in an attempt to influence the consumer's buying preferences. For example, as the consumer 200 traverses through the store, he touches the RFID device 102 attached to a desired item 500 (e.g., a 12-pack of Cola X). Upon touching the RFID device 102, the RFID device 102 transmits at least a portion of its data field 300 to the store shelf 418 (e.g., UPC 302) which is passed on to the store server 402. To identify which consumer touched the item 500, the store server 402 requests an identification read from the user device 416 through any communications method available. This can be done, for example, by associating the shelf location with the nearest user device 416. Alternatively, the system may be designed such that the user device 416 and store shelf 418 can communicate directly. Once the consumer is identified, the in-store server may be able to determine that the consumer is a loyal consumer of Cola X. As a result, the store may decide to influence the consumer's buying pattern by transmitting a code to the user device 416 to display that there will be a reduced price on Cola Y for this consumer 200. This reduced price for the consumer can be downloaded onto the user device 416 and presented at checkout for discount, or the reduced price can be programmed onto the RFID device associated with Cola Y 500 picked up by the consumer. The programming of the RFID device associated with Cola Y 500 can be performed with user device 416 if equipped with a writer, or through the store shelf 418 when the consumer touches Cola Y 500. As previously explained, when the RFID-equipped item 500 is touched, an electrical path occurs between the item 500 and the reader 418 allowing the item 500 to communicate with the reader 418. In this embodiment, the RFID device 102 would be capable of receiving commands from the reader 418 such that the reader 418 can re-program the data field 300 in the RFID device 102. Specifically, it may re-program at least a portion of the retailer information 306 which may contain the reduced price. Allowing the RFID device 102 to be re-programmed by the reader 418 allows for the product to be electronically priced with the reduced price. Optionally, the RFID device can be reprogrammed yet again to a default incentive if the item was not purchased and an expiration period has expired for the promotional incentive.

Another way to determine if a consumer is interested in the item 500 is to perform real time inventory of the shelf. If an item is not on the inventory list during one of multiple shelf inventory checks, but it was there in the previous check and is there after the current check, it is assumed that the item 500 was "handled" and replace without a purchase. The retailer or the distributor could use this data mining of information to determine the "attractiveness" (i.e., touched but not purchased) of an item 500, inventory control (i.e., touched and purchased), as well as theft prevention (i.e., removed from shelf but not purchased). It should be noted that each item 500 could have a unique identification field 300 which can be compared with the identification field 300 of items that have been purchased to determine if there are any discrepancies between the inventory and the items purchased. Shelf inventory can be performed by increasing reader power or by providing a common return path on the shelf through a plate that couples to the antenna element 104. Details on powering a RFID device with a shelf reader can be found in co-pending U.S. Ser. No. 09/669,289, filed Sep. 25, 2000, titled "Method and Apparatus for Selectively Activating Radio Frequency Identification Tags that are in Close Proximity", by Collins et al., commonly owned together with this application by Motorola, Inc., the disclosure of which prior application is hereby incorporated by reference, verbatim and with the same effect as though it were fully and completely set forth herein.

Thus, the present invention can be used to provide information about a particular item and/or enhance the incentive provided by the retailer. The consumer presents the RFID device 102 to the reader 206 (418) through methods shown in FIGS. 2A, 2B, 2C and 5, allowing the user device 416 to detect the data field 300 transmitted by the RFID device 102. Information is displayed directly from the RFID device 102 or accessed from the in-store server 402 to the user device 416 using the appropriate communication path (i.e., radio frequency, hardwired, or the like). Information, such as directions to the item, price discounts based on quantity, or menu ingredients, based on a selected product are examples of possible information retrieval.

No matter what user device 416 is used to access the information, the present invention allows the consumer 200 to identify specific items 500 to the in-store system 400, and the processing means 400 updates the RFID device 102, preferably at the point-of-decision by the consumer, with new promotions/incentives based on the selected products or in association with the purchase of an additional product. Further, after redemption of the RFID device 102, the in-store server 402 could determine the consumer's shopping preferences based upon which items 500 were touched but not purchased or handled, and which products were purchased as a result of a discount given at the point-of-decision.

Thus, the present invention allows a data collection mechanism that is transparent to the consumer 200. The ability to uniquely program the data field 300 allows the distributor to independently program the distributor information 304. The ability to uniquely program the data field 300, for example, with a zip code specific to that coupon and yet have similar coupons with unique zip codes be used at different distribution centers allows for easy regional specific gathering and analysis of regional marketing information by each manufacturer.

Data gathered by the RFID device 102 and/or the in-store system 400 can be used to produce market conclusions at a geographic area or a particular retail establishment. Manufacturers that employ the promotional material 100 as described in the present invention can determine region usage, not just distribution coverage, usage over any given time period, effectiveness of the distribution method, and effectiveness within the consumer target groups.

Moving on to the second environment described herein, a RFID device 102' having stored thereon a counter and a set of data bits which, when presented to a processing device via a RFID reader, causes the processing device to enable/enhance (and in some instances disable) a feature that would otherwise be disabled in an electronic device, and disable the feature when the counter reaches a predetermined value. The feature may include, but is not limited to, an improvement to the performance and/or characteristic of the electronic device (e.g. new powers, capabilities, characters, calendar updates, or the like). The electronic device may be, but is not limited to, an electronic game console, a personal digital assistant, a cellular telephone, and a pager. The counter provides an automatic expiration of the enabled/enhanced feature. The counter can track the number of times the RFID device 102' has been used, track a period of time in which the RFID device is used, or the like.

The RFID device 102' is constructed as described above in FIGS. 1 or 2A and can coupled the reader in a monopole, dipole, or contact configuration. The RFID device 102' is attached to the promotional material (e.g., collector's card, game piece, game token, etc.) and can be placed into product packages (e.g., cereal boxes, magazines, etc.) as an incentive to purchase the product, sold individually as an enhancement feature to a game, distributed as a sales or marketing incentive, or the like. The set of data bits is programmed into the RFID device 102 at one of the following events: point-of-decision to purchase the item, point-of-purchase of the item, point-of-possession, and point-of-distribution of the item.

Figure 6:
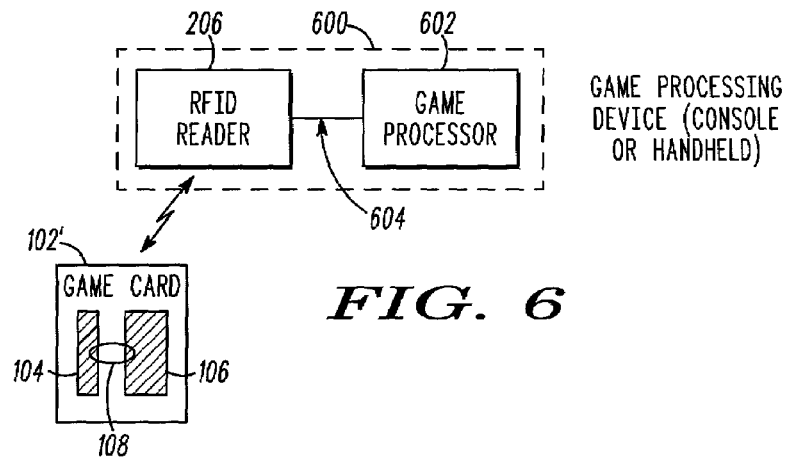
FIG. 6 illustrates a perspective view of another embodiment, wherein electronic games can be enhanced in a contact or contactless fashion in accordance with the present invention.
Figure 7:
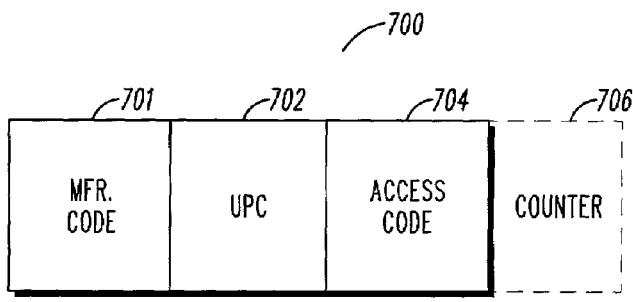
FIG. 7 illustrates an example view of how the programmable bits on a game card are segmented to provide an incentive/enhancement to software loaded into a game console in accordance with the present invention.

Turning to FIGS. 6 and 7, the RFID device 102', used in conjunction with a game console/controller 600, would enable new powers or capabilities of a game that were not accessible without the RFID device 102'. An example is illustrated of how data bits of circuit 108 can be programmed onto the RFID device 102' which would contain, but is not be limited to, a manufacturer's code 701, a UPC code 702, and a game access code 704. The RFID device 102' may enable a new feature by providing the access code 704 to a processor 602 via the RFID reader 206 and link 604, and instructing the processor 602 to perform a function it already has programmed into it. The access code 704 would be preprogrammed prior to distribution of the product, or preferably, programmed at the point-of-purchase, with advertising gimmicks such as "this week's" game power. Allowing the RFID device 102' to be programmed at the point-of-purchase encourages the consumer 200 to purchase a new product each week so as to obtain the latest game power.

The game console/controller 600 is capable of reading and/or writing information to the access code 704 located on the RFID device 102'. In the case of writing information, the RFID device 102' is preferably deactivated by the game console/controller 600 after a predetermined number of uses or a predetermined period of time, thus encouraging the consumer to purchase another product to receive a new RFID device 102' that may contain additional features. The reader 206 within the game console/controller 600 needs to at least be capable of powering the RFID device 102' and demodulating and/or modulating and demodulating, the data transmitted 701, 702, 704 by the RFID device 102. Contactless RFID access to the data on the RFID device 102' reduces a failure point associated with contact technology, although a contacted interface could be employed by the present invention.

Regardless of how the RFID device 102' is accessed, the RFID device 102' could be as simple as a read-only card which, when powered, would transmit the bits that were stored in circuit 108. In an alternative embodiment, the RFID device 102' could have more complex features, such as being capable of receiving commands as well as modifying the data stored on circuit 108.

Figure 8:
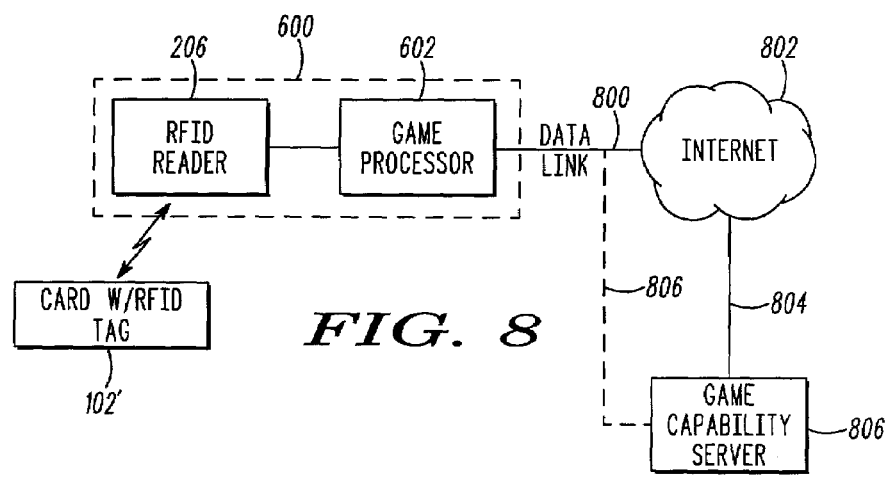
FIG. 8 illustrates yet another embodiment, wherein the present invention can be used to enhance or enable new games on a electronic game console by providing a secure code to the game server via an internet link in accordance with the present invention.

As FIG. 8 indicates, a reader/writer can interface to the Internet 802 through the game console/controller 600 or some other means. The data stored in the RFID device 102' would contain an access code 704 (e.g., an Internet address) that would allow the game console/controller 600 to download new software onto the game console/controller 600 from a game capability server 806 (e.g., located at the Internet address). The new software would enable new features on the game console/controller 600. The game console/controller 600 would be equipped with a data modem (not shown) to allow for communication with the remote game capability server 806. This modem port could comprise a cable television modem, a telephone landline modem, or any other communication means selected by the game console manufacturer. The data link between the game console/controller 600 and the game capability server 806 could be established either through the Internet 800, 802, 804, or directly 806 via a telephone landline connection.

Moreover, RFID-equipped promotional material 100 allows retailers to entice consumers by linking RFID-equipped electronic games 600 to the promotional material 100. In this example, the promotional material may be a code that allows an electronic game to perform differently. For example, a consumer may go to restaurant where he receives a RFID device 102' with each value meal. When the RFID device 102' is presented to a RFID-equipped electronic game 600, the RFID device 102' allows, for example, a character to have different or enhanced powers. In the preferred embodiment, the RFID device 102' can be reprogrammed by the RFID-equipped electronic game 600. In this example, the data field 700 in circuit 108 on the RFID device 102' contains an access code 704. Part of the access code 704 may contain a counter field 706. The purpose of the counter field 706 is to keep track of the number of times the RFID device 102' has been used, the number of times the game was won, or other events which accrue to the expiration of the capabilities of the device. Each time the RFID device 102' is presented to the RFID-equipped electronic game 600, the counter field 706 is modified to indicate an increase in the number of times the RFID device 102' was used. When all of the fields are filled (i.e., programmed to a state which disables the RFID card 102') the RFID device 102' is expired, and thus disabled, forcing the consumer to purchase another value meal from the restaurant that contains a new RFID device 102'. Alternatively, the counter field 706 could keep track of a period of time in which the RFID device is not expired.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A promotional material comprising a visual aid that identifies a consumer product other than the promotional material, the promotional material further comprising a radio frequency identification ("RFID") device having stored thereon an expiration and a set of data bits which, when presented to a processing device via a RFID reader, causes the processing device to enable at least one feature that would otherwise be disabled in an electronic device having a plurality of features, and disable the at least one feature when the expiration reaches a predetermined value, wherein the at least one feature is an improvement to a performance or a characteristic of the electronic device.

2. The promotional material of claim 1 wherein the set of data bits is programmed into the RFID device at the point of sale of the product.

3. The promotional material of claim 1 wherein the predetermined value is based on a number of uses of the electronic device.

4. The promotional material of claim 1 wherein the predetermined value is based on a period of time.

5. The promotional material of claim 1 wherein the predetermined value is based on an event that occurs in the electronic device.

6. The promotional material of claim 1 wherein the RFID reader is capable of powering the RFID device, receiving data transmitted by the RFID device, and sending the data to the processing device.

7. The promotional material of claim 6 wherein the RFID reader is also capable of transmitting modulated data.

8. The promotional material of claim 1 wherein the electronic device is selected from a group consisting of: an electronic game console, a personal digital assistant, a cellular telephone, and a pager.

9. The promotional material of claim 1 wherein the set of data bits comprises an access code that would enable at least one of the plurality of features.

10. The promotional material of claim 1 wherein the RFID device is attached to an item selected from a group consisting of: a game piece, a collector's card, a game card, and a token.

11. The promotional material of claim 1 wherein the RFID device is capacitively coupled to the RFID reader.

12. The promotional material of claim 1 wherein the RFID device is inductively coupled to the RFID reader.

13. The promotional material of claim 1 wherein the RFID device is coupled to the RFID reader via a contacted interface.

14. The promotional material of claim 1 wherein the RFID device comprises an antenna element and a circuit coupled to the antenna element, and wherein the RFID device and the RFID reader are coupled to a common return path.

15. The promotional material of claim 1 wherein the RFID device couples to the RFID reader in a dipole configuration.

16. The promotional material of claim 1 wherein the RFID device couples to the RFID reader in a monopole configuration.

17. The promotional material of claim 1 wherein the RFID device is associated with a product, and wherein the set of data bits is programmed into the RFID device at a point of decision to purchase the product of a user.

18. The promotional material of claim 1 wherein the RFID device is associated with a product, and wherein the set of data bits is programmed into the RFID device at a point of possession of the product of a user.

19. The promotional material of claim 1 wherein the RFID device is associated with a product, and wherein the set of data bits is programmed into the RFID device at a point of distribution of the product.

20. A promotional material comprising a visual aid that identifies a consumer product other than the promotional material, the promotional material further comprising a radio frequency identification ("RFID") device having stored thereon a counter and a set of data bits which, when presented to a processing device via a RFID reader, causes the processing device to disable at least one feature that would otherwise be enabled in an electronic device having a plurality of features, and enable the at least one feature when the counter reaches a predetermined value, wherein the at least one feature is an improvement to a performance or a characteristic of the electronic device.

21. A promotional material comprising a visual aid that identifies a consumer product other than the promotional material, the promotional material further comprising a radio frequency identification ("RFID") device having stored thereon a counter and a set of data bits which, when presented to a processing device via a RFID reader, causes the processing device to enhance at least one feature in an electronic device having a plurality of features, wherein the at least one feature is an improvement to a performance or a characteristic of the electronic device.

22. The promotional material of claim 21 wherein the enhancement to the feature is disabled when the counter reaches a predetermined value.

23. The promotional material of claim 22 wherein the predetermined value is based on one of the following events: a number of uses, and a period of time.

* * * * *